United States Patent [19]

Vinci et al.

[11] Patent Number: 5,244,681

[45] Date of Patent: Sep. 14, 1993

[54] LIQUID NUTRIENT FORMULATIONS

[75] Inventors: Alfredo Vinci, Dayton; Kenneth R. Cummings, Skillman, both of N.J.; Thomas F. Sweeney, Morrisville, Pa.; M. Stephen Lajoie, Basking Ridge, N.J.

[73] Assignee: Church & Dwight Co., Inc., Princeton, N.J.

[21] Appl. No.: 802,265

[22] Filed: Dec. 4, 1991

[51] Int. Cl.$^5$ ............................................. A23K 1/00
[52] U.S. Cl. .................................. 426/72; 426/74; 426/601; 426/648; 426/656; 426/658; 426/807; 514/748
[58] Field of Search ............... 426/72, 74, 601, 656, 426/648, 623, 630, 807; 514/784

[56] References Cited

U.S. PATENT DOCUMENTS

| | | | |
|---|---|---|---|
| 3,895,117 | 7/1975 | Backlund | 426/648 |
| 3,916,031 | 10/1975 | Beal | 426/648 |
| 4,267,197 | 5/1981 | Sawhill | 426/648 |
| 4,804,546 | 2/1989 | Sawhill | 426/807 |
| 4,888,185 | 12/1989 | Miller | 426/807 |
| 4,925,637 | 5/1990 | Julien et al. | 426/807 |
| 4,937,082 | 6/1990 | Sawhill | 426/807 |
| 4,994,284 | 2/1991 | Miller | 426/807 |
| 5,063,067 | 11/1991 | Binder | 426/807 |
| 5,066,501 | 11/1991 | Evans | 426/807 |
| 5,077,068 | 12/1991 | Julien et al. | 426/807 |

*Primary Examiner*—R. B. Penland
*Attorney, Agent, or Firm*—Charles B. Barris

[57] ABSTRACT

In one embodiment this invention provides a liquid nutrient formulation which is an aqueous suspension with a high content of nutrient ingredients, and optional ingredients such as medicaments.

A primary ingredient of an invention formulation is one or more $C_{14}$–$C_{22}$ fatty acid alkali metal or ammonium salts suitable as a high energy supplement for ruminant feedstock.

19 Claims, No Drawings

LIQUID NUTRIENT FORMULATIONS

BACKGROUND OF THE INVENTION

Feed supplement compositions for consumption by animals are now in widespread commercial use. Dry supplement compositions are usually formulated to contain urea in combination with various carriers and nutrients, including cellulose, starch, soybean meal as carriers and sugars as nutrients. A disadvantage of such dry feed supplements is the difficulty in achieving uniform distribution of components throughout the composition. In addition, dry supplements which contain multiple components having varying particle sizes are susceptible to segregation of the components during storage which further reduces the uniformity of component distribution throughout the composition.

More recently, interest has turned to liquid feed supplement compositions which have numerous advantages as compared to dry feed supplement compositions. Since these supplements are in the liquid phase, the different components can be uniformly distributed throughout the liquid phase with relative ease. In addition, such liquid feed supplement compositions can be produced more economically in terms of capital investment because the only apparatus required includes mixing tanks and pumps, whereas the manufacture of dry supplement compositions requires more elaborate materials handling equipment.

However, it has been found that fluid suspension animal feed supplements suffer the disadvantage of being relatively unstable. The fluid compositions tend to undergo settling of solid constituents and formation of solid aggregates. These changes impair the flow rates and viscosity values of the suspensions. The inherent difficulties with fluid animal feed compositions are described and improvements are proposed in technical publications such as U.S. Pat. Nos. 3,684,518; 3,794,740; 3,934,041; 4,267,197; 4,382,966; 4,937,082; and 4,994,284.

There is continuing interest in the research and development of new and improved liquid suspension animal feed compositions.

Accordingly, it is an object of this invention to provide a stable liquid nutrient suspension composition for application as an animal feed supplement.

It is another object of this invention to provide a liquid nutrient formulation which is an aqueous suspension having a high fat content, and containing additional biologically active ingredients.

Other objects and advantages of the present invention shall become apparent from the accompanying description and examples.

DESCRIPTION OF THE INVENTION

One or more objects of the present invention are accomplished by the provision of a liquid nutrient formulation which is an aqueous suspension medium containing constituents comprising:

(a) $C_{14}$-$C_{22}$ fatty acid alkali metal or ammonium salt; and (b) a biologically active ingredient;

wherein the aqueous suspension medium has a pH in the range between about 4-12, and a viscosity in the range between about 5-5000 cps at 25° C.

In another embodiment this invention provides a liquid nutrient formulation which is an aqueous suspension medium containing constituents comprising:

(a) fatty acid alkali metal or ammonium salt;

(b) a biologically active ingredient; and (c) a suspension stabilizing agent;

wherein the aqueous suspension medium has a pH in the range between about 4-12, and a viscosity in the range between about 5-5000 cps at 25° C.

In another embodiment this invention provides a liquid nutrient formulation which is an aqueous suspension medium containing constituents comprising:

(a) fatty acid alkali metal or ammonium salt;

(b) a biologically active ingredient;

(c) a water-soluble carbohydrate; and (d) a suspension stabilizing agent;

wherein the aqueous suspension medium has a pH in the range between about 4-12, and a viscosity in the range between about 5-5000 cps at 25° C.

In a further embodiment this invention provides a method of supplying a nutrient supplement to an animal which comprises incorporating a present invention liquid nutrient formulation into the animal's dry feed ration, in an amount which provides between about 1-10 weight percent of supplemental nutrients, based on the feed weight.

An alternate means of supplying a nutrient supplement to an animal is by blending a present invention water-dilutable nutrient formulation into the animal's water supply. A present invention liquid nutrient formulation is particularly suitable for supplying supplemental nutrients to ruminants.

The content of water-insoluble ingredients which are suspended in an invention liquid nutrient formulation usually will be in the range of 10-40 weight percent of formulation weight. The particle size of the suspended phase generally will range from colloidal to a particle size of solid which passes through a 100 mesh U.S. standard screen.

The content of ingredients in a liquid nutrient formulation typically will conform to the following proportions:

| Ingredient | Weight Percent |
| --- | --- |
| fatty acid salt | 15-60 |
| biologically active constituent | 5-30 |
| carbohydrate | 0-50 |
| suspension stabilizing agent | 0-2 |
| antioxidant | 0-0.5 |
| preservative | 0-1 |
| other optional constituents | 0-30 |

The essential fat ingredient is selected from $C_{14}$-$C_{22}$ fatty acid salts of alkali metal and ammonium ions. The alkali metal ions are illustrated by sodium, potassium and lithium, and the ammonium ions are illustrated by the $H^{\oplus}NR^3$ structure, where R is hydrogen or a $C_1$-$C_4$ alkyl substituent.

Suitable $C_{14}$-$C_{22}$ fatty acids include myristic, palmitic, stearic, arachidic, behenic, oleic, ricinoleic, linoleic, linolenic, gadoleic, and the like, singly or in any combination. The unsaturated fatty acids typically are mixtures of cis and trans isomers.

The biologically active constituent of an invention nutrient formulation can be selected from a broad variety of nutrients and medicaments, either as a single component or as a mixture of components, which are illustrated by the following listing of active molecular species:

1. $C_2$–$C_{22}$ aliphatic carboxylic acids and esters, and alkali metal, ammonium and alkaline earth metal salts which are different than the selected fatty acid salt ingredient of the nutrient formulation.

2. sugars and complex carbohydrates which include both water-soluble and water-insoluble monosaccharides, disaccharides and polysaccharides.

Cane molasses is a byproduct from the extraction of sucrose from sugar cane. It is commercially available at standard 79.5° Brix concentration, which has a water content of about 21 weight percent, and a sugar content of 50 weight percent. Sugar beet byproducts also are available as low cost carbohydrate sources.

Whey is a byproduct of the dairy industry. The whey is a dilute solution of lactalbumin, lactose, fats, and the soluble inorganics from milk. Dried whey solids typically have the following composition:

| | |
|---|---|
| protein | 12.0% |
| fat | 0.7% |
| lactose | 60.0% |
| phosphorus | 0.79% |
| calcium | 0.87% |
| ash | 9.7% |

Another source of carbohydrate is derived from the pulp and paper industry which produces large quantities of byproduct lignin sulfonates from wood during the sulfite pulping process. The byproduct is recovered in the form of salts such as ammonium, sodium and magnesium lignin sulfonates.

3. aminoacid ingredients either singly or in combination which include arginine, histidine, isoleucine, leucine, lysine, methionine, phenylalanine, threonine, tryptophan, valine, tyrosine ethyl HCl, alanine, aspartic acid, sodium glutamate, glycine, proline, serine, cysteine ethyl HCl, and the like, and analogs thereof.

4. vitamin ingredients either singly or in combination which include thiamine HCl, riboflavin, pyridoxine HCl, niacin, inositol, choline chloride, calcium pantothenate, biotin, folic acid, ascorbic acid, vitamin $B_{12}$, p-aminobenzoic acid, vitamin A acetate, vitamin K, vitamin D, vitamin E, and the like.

Trace element ingredients include compounds of cobalt, copper, manganese, iron, zinc, tin, nickel, chromium, molybdenum, iodine, chlorine, silicon, vanadium, selenium, calcium, magnesium, sodium and potassium.

5. protein ingredients as obtained from sources such as dried blood or meat meal, cottonseed meal, soy meal, dehydrated alfalfa, dried and sterilized animal and poultry manure, fish meal, liquid or powdered egg, fish solubles, cell cream, rape seed oil (canola oil), and the like.

Protein equivalent ingredients include non-protein nitrogen compounds such as urea, biuret, ammonium phosphate, and the like.

6. medicament ingredients either singly or in combination which include promazine hydrochloride, chloromadionate acetate, chlorotetracycline, sulfamethazine, monensin, sodium monensin, poloxaline, and the like. Oxytetracycline is a preferred antibiotic for cattle prophylaxis.

7. enzymes such as lipolytic proteins which aid feed digestibility, e.g., by hydrolysis of fatty acid glycerides to free fatty acid and glycerol.

8. antioxidants as illustrated by butylated hydroxyanisole, butylated hydroxytoluene, tertiary-butylhydroquinone, propyl gallate, and ethoxyquin; and suitable preservatives include sodium sorbate, potassium sorbate, sodium benzoate, propionic acid, α-hydroxybutyric acid, and the like.

9. suspension stabilizing agents which preferably are selected from nonionic surfactants, hydrocolloids and cellulose ethers. These types of chemical agents are illustrated by polyethylene oxide condensates of phenols, $C_8$–$C_{22}$ alcohols and amines; ethylene oxide reaction products with fatty acid partial esters of hexitans; alkylarylpolyoxyethylene glycol phosphate esters; gum arabic; carob bean gum; guar gum; tragacanth gum; ammonium, sodium, potassium and calcium alginates; glycol alginates; xanthan gum; potato agar; alkylcellulose; hydroxyalkylcellulose; carboxyalkylcellulose; and the like.

A liquid nutrient formulation is prepared by adding the selected ingredients successively to the aqueous medium with stirring. One or more ingredients also can be premixed before addition to the aqueous medium, such as a mixture of fatty acids, or a vitamin or trace element premix composition.

It is advantageous to utilize high shear mixing when a formulation with a large proportion of water-insoluble solids is being homogenized. An inorganic powder such as magnesium oxide which undergoes hydration preferably is added as the first ingredient to the aqueous medium in order to minimize agglomeration of the fine particles.

The pH of a liquid nutrient formulation can be adjusted by the addition of ammonium hydroxide, potassium hydroxide, orthophosphoric acid, hydrochloric acid, acetic acid, citric acid, or the like, as appropriate to achieve the desired pH level.

A preferred type of liquid nutrient formulation maintains homogeneity and is viscosity stable for a period of several weeks under variable temperature conditions.

An invention liquid nutrient formulation is a highly concentrated nutrient vehicle which can be utilized in undiluted or diluted form to introduce supplemental nutrients and optional medicaments into an animal's feeding regimen.

The following examples are further illustrative of the present invention. The components and specific ingredients are presented as being typical, and various modifications can be derived in view of the foregoing disclosure within the scope of the invention.

EXAMPLE I

This Example illustrates the preparation of liquid nutrient formulations containing an aminoacid ingredient.

| | |
|---|---|
| potassium oleate | 350 g |
| potassium stearate | 350 g |
| palmitic acid | 100 g |
| methionine hydroxy analog | 200 g |

The ingredients are added in the listed order to one liter of water with high speed stirring.

The viscosity of the resultant emulsion is measured on a Brookfield viscometer with a number 6 spindle at 12 rpm. The emulsion has a viscosity of about 300 centipoises, and a pH of 8.

Another emulsion is prepared in the described manner except that two grams of guar gum are added to the liter of water before the other ingredients. The measured viscosity of the emulsion is about 800 centipoises.

Another emulsion is prepared except that 20 grams of sucrose are dissolved in the liter of water before the other ingredients are added. The viscosity of the emulsion is about 900 centipoises.

Another emulsion is prepared except that 20 grams of whey solids are dissolved in the liter of water, and then 2 grams of polyethylene glycol (400) monooleate are added with stirring before the other ingredient additions. The viscosity of the emulsion is about 1500 centipoises.

EXAMPLE II

This Example illustrates the preparation of a liquid nutrient formulation containing protein and trace mineral ingredients.

| | |
|---|---|
| potassium linoleate | 500 g |
| soy bean meal | 300 g |
| soy lecithin | 10 g |
| tricalcium phosphate | 5 g |
| trace minerals[1] | 2 g |
| vitamin A | 1 g |
| xanthan gum (Kelco) | 3 g |

The listed ingredients, except for the xanthan gum, are blended to form a homogeneous dry mixture. The xanthan gum is added to 1200 milliliters of water, and then the dry mixture is added to the water medium with high speed stirring to form a stable suspension.

The formulation has a viscosity of about 1600 centipoises, and a pH of 8.5.

| | Weight Ratio |
|---|---|
| [1]$CoSO_4.7H_2O$ | 4 |
| $CuSO_4.5H_2O$ | 5 |
| $MnSO_4.H_2O$ | 6 |
| $FeSO_4.7H_2O$ | 7 |
| $ZnSO_4.H_2O$ | 3 |

EXAMPLE III

This Example illustrates the preparation of a liquid nutrient formulation containing water-soluble carbohydrate and a non-protein nitrogen ingredient.

| | |
|---|---|
| palm oil distillate sodium salt[1] | 400 g |
| 79.5° Brix cane molasses | 300 g |
| 50% urea solution | 50 g |
| magnesium oxide (200 mesh) | 20 g |
| xanthan gum | 2 g |
| propionic acid | 2 g |
| butylated hydroxytoluene | 0.5 g |

The xanthan gum is hydrated in one liter of water, and the magnesium oxide is slurried in the aqueous medium with stirring. The molasses, urea and palm oil distillate then are added in succession with high speed stirring to form a stable suspension.

The formulation has a viscosity of about 2000 centipoises, and a pH of 9.5.

| | |
|---|---|
| [1]Lauric acid | 2.3% |
| Palmitic acid | 49.9% |

-continued

| | |
|---|---|
| Stearic acid | 5.4% |
| Oleic acid | 35.0% |
| Linoleic acid | 7.4% |

What is claimed is:

1. A liquid nutrient formulation which is an aqueous suspension medium containing constituents consisting essentially of:
   (a) between about 15-60 weight percent of $C_{14}$-$C_{22}$ fatty acid alkali metal or ammonium salt, based on the weight of the aqueous suspension medium; and
   (b) a biologically active ingredient;
   wherein the aqueous suspension medium has a pH in the range between about 4-12, and a viscosity in the range between about 5-5000 cps at 25° C., said liquid nutrient formulation having a high energy content and functioning at a rumen-bypass material.

2. A nutrient formulation in accordance with claim 1 wherein the biologically active ingredient content is between about 5-30 weight percent of the aqueous suspension medium.

3. A liquid nutrient formulation which is an aqueous suspension medium containing constituents consisting essentially of:
   (a) between about 15-60 weight percent of $C_{14}$-$C_{22}$ fatty acid alkali metal or ammonium salt, based on the weight of the aqueous suspension medium;
   (b) a biologically active ingredient; and
   (c) a suspension stabilizing agent;
   wherein the aqueous suspension medium has a pH in the range between about 4-12, and a viscosity in the range between about 5-5000 cps at 25° C., said liquid nutrient formulation having a high energy content and functioning as a rumen-bypass material.

4. A nutrient formulation in accordance with claim 3 wherein the fatty acid constituent is a mixture comprising 0-10 percent lauric acid, 0-60 percent palmitic acid, 0-10 percent stearic acid, 0-60 percent oleic acid, and 0-10 percent linoleic acid.

5. A nutrient formulation in accordance with claim 3 wherein the biological active ingredient content is between about 5-30 weight percent of the aqueous suspension medium.

6. A nutrient formulation in accordance with claim 3 wherein the biologically active constituent is a nutrient.

7. A nutrient formulation in accordance with claim 3 wherein the biologically active constituent is a medicament.

8. A nutrient formulation in accordance with claim 3 wherein the biologically active constituent comprises at least one aminoacid.

9. A nutrient formulation in accordance with claim 3 wherein the biologically active constituent comprises at least one polypeptide.

10. A nutrient formulation in accordance with claim 3 wherein the biologically active constituent comprises at least one antibiotic.

11. A nutrient formulation in accordance with claim 3 wherein the biologically active constituent comprises at least one vitamin or trace element.

12. A nutrient formulation in accordance with claim 3 wherein the suspension stabilizing agent is a nonionic surfactant.

13. A nutrient formulation in accordance with claim 3 wherein the suspension stabilizing agent is a hydrocolloid.

14. A nutrient formulation in accordance with claim 3 wherein the suspension stabilizing agent is a cellulose ether.

15. A nutrient formulation in accordance with claim 3 wherein the aqueous suspension medium contains $C_{14}$–$C_{22}$ fatty acid alkaline earth metal salt.

16. A liquid nutrient formulation which is an aqueous suspension medium containing constituents consisting essentially of:
   (a) between about 15–60 weight percent of $C_{14}$–$C_{22}$ fatty acid alkali metal or ammonium salt, based on the weight of the aqueous suspension medium;
   (b) a biologically active ingredient;
   (c) a water-soluble carbohydrate; and
   (d) a suspension stabilizing agent; wherein the aqueous suspension medium has a pH in the range between about 4–12, and a viscosity in the range between about 5–5000 cps at 25° C., said liquid nutrient formulation having a high energy content and functioning as a rumen-bypass material.

17. A method of supplying a nutrient supplement to an animal which comprises incorporating a liquid nutrient formulation into the animal's dry feed, in an amount which provides at least one weight percent of supplemental nutrients, based on the feed weight; wherein the added liquid nutrient formulation is an aqueous suspension medium containing constituents consisting essential of:
   (a) between about 15–60 weight percent of $C_{14}$–$C_{22}$ fatty acid alkali metal or ammonium salt, based on the weight of the aqueous suspension medium; and
   (b) biologically active ingredient; wherein the aqueous suspension medium has a pH in the range between about 4–12, and a viscosity in the range between about 5–5000 cps at 25° C., said liquid nutrient formulation being suitable as a high energy supplement for ruminant feedstock.

18. A method in accordance with claim 17 wherein the animal is a ruminant.

19. A method of supplying a nutrient supplement to an animal which comprises adding a liquid nutrient formulation into the animal's water supply; wherein the added liquid nutrient formulation is an aqueous suspension medium containing constituents consisting essentially of:
   (a) between about 15–60 weight percent of $C_{14}$–$C_{22}$ fatty acid alkali metal or ammonium salt, based on the weight of the aqueous suspension medium; and
   (b) a biologically active ingredient; wherein the aqueous suspension medium has a pH in the range between about 4–12, and a viscosity in the range between about 5–5000 cps at 25° C., said liquid nutrient formulation being suitable as a high energy supplement for ruminant feedstock.

* * * * *